United States Patent [19]

Sumser et al.

[11] Patent Number: 5,324,064

[45] Date of Patent: Jun. 28, 1994

[54] ADJUSTABLE HEIGHT MECHANISM FOR A COLLAPSIBLE SUPPORT FRAME

[75] Inventors: Daniel P. Sumser, North Canton; Michael P. Green, Youngstown, both of Ohio

[73] Assignee: Century Products Company, Macedonia, Ohio

[21] Appl. No.: 877,327

[22] Filed: May 1, 1992

[51] Int. Cl.$^5$ .......................... A47D 13/04; B62B 7/06
[52] U.S. Cl. ..................................... 280/649; 108/120; 280/87.051; 482/68
[58] Field of Search ............... 280/87.05, 87.051, 644, 280/649; 297/5; 108/119, 120, 117; 482/68, 66

[56] References Cited

U.S. PATENT DOCUMENTS

| | | | |
|---|---|---|---|
| 2,663,102 | 12/1953 | Olander | 108/117 |
| 4,019,756 | 4/1977 | Ishida | 280/87.051 |
| 4,359,242 | 11/1983 | Gerken et al. | 280/87.051 |
| 4,433,869 | 2/1984 | Payne, Jr. et al. | 108/119 |
| 4,576,392 | 3/1986 | Quinlan, Jr. | 280/87.05 |
| 4,759,541 | 7/1988 | Chen | 280/87.051 |
| 4,799,700 | 1/1989 | Knoedler et al. | 280/87.051 |

Primary Examiner—David M. Mitchell
Attorney, Agent, or Firm—Graham & James

[57] ABSTRACT

An adjustable height mechanism for use in devices employing a collapsible scissors frame supporting an object is disclosed having a pair of pawls secured to the sliding leg of the scissors frame and slidably mounted onto a pair of guide rails. A central channel is positioned between the guide rails and receives a guide member extending from the leg to provide additional tracking and lateral stability during movement of the leg. A pair of spring biased, pivoting ratchet arms are mounted to the supported object and include a series of ratchet stops and a finger grip. The ratchet arms engage the pawls to restrict movement of the leg of the scissors frame in one direction while allowing ratcheting free movement in the opposite direction. The finger grips can be used by the user to squeeze the free ends of the arms together and release the ratcheting engagement with the pawls to provide height adjustment of the object supported by the scissors frame.

9 Claims, 4 Drawing Sheets

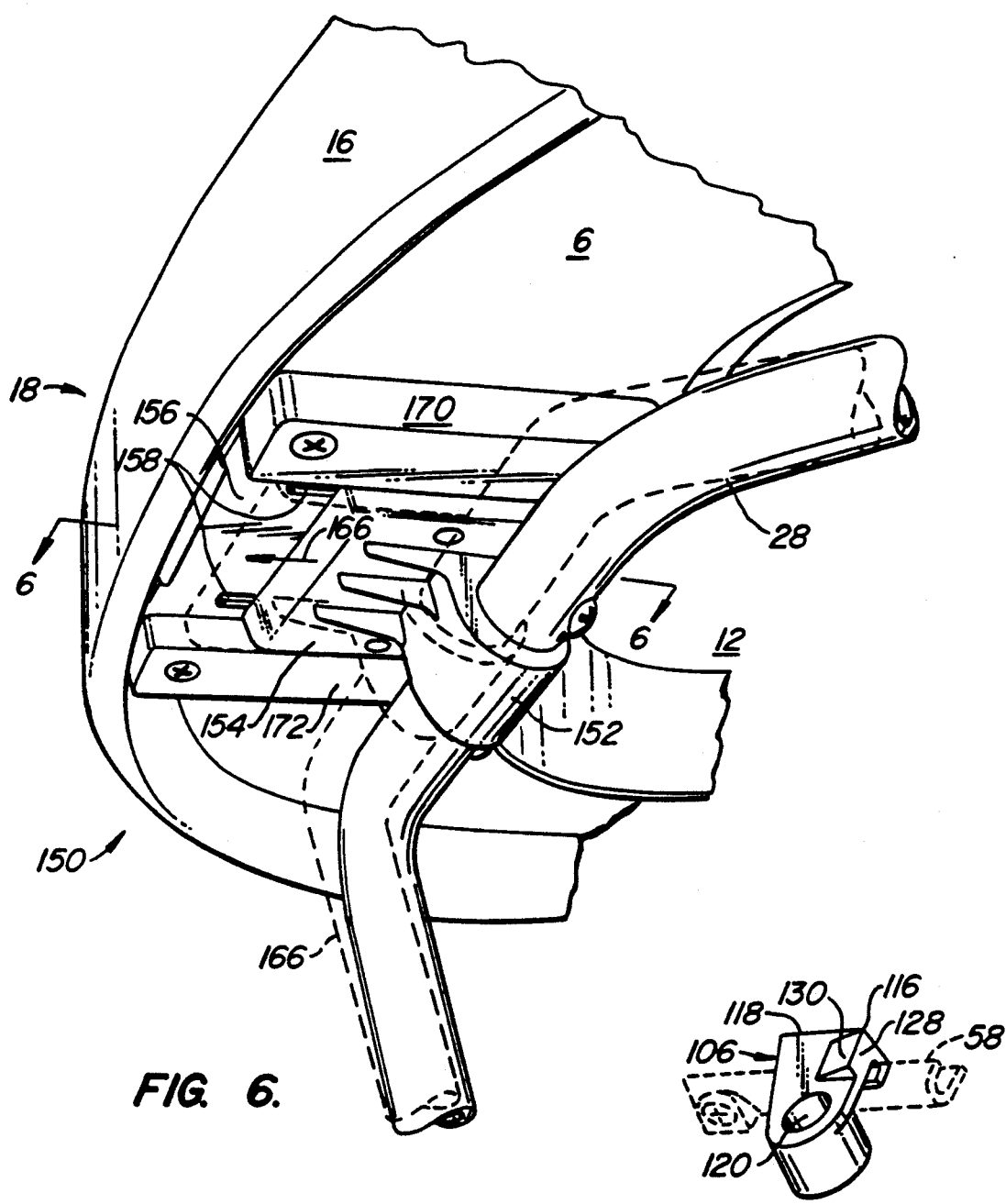
FIG. 6.
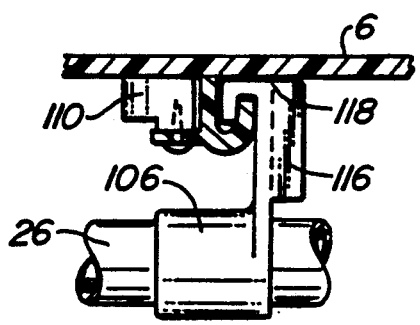
FIG. 5.
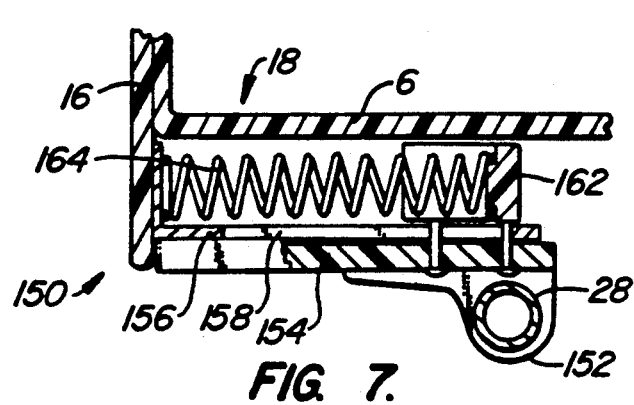
FIG. 3B.
FIG. 7.

ADJUSTABLE HEIGHT MECHANISM FOR A COLLAPSIBLE SUPPORT FRAME

BACKGROUND OF THE INVENTION

This invention generally relates to adjustable collapsible frame devices, and more specifically to adjustable catch mechanisms for locking a vertically collapsible support frame at graduated heights particularly adaptable for baby furniture.

Vertically collapsible scissors frames are advantageously employed to support objects such as tables, trays, and other articles which can benefit from the collapsible feature to facilitate reduction of space requirements for storage and transportation. In baby furniture, such as baby walkers, play seats and feeding tables, scissors frames are particularly advantageous. Baby furniture demands collapsibility for storage and transport because it must be conveniently carried and quickly deployed in various locations and at various times. Scissors frame construction allows the supported object to be moved between a fully elevated condition to a collapsed, compact position. Further, scissors frames allow adjustable height selection of the object supported by offering varying degrees of extension of the scissors frame. For devices such as baby walkers, baby tables and the like, this feature is particularly beneficial to accommodate the natural growth of a child or adaptability between multiple children of different sizes.

Generally, a scissors frame has at least two legs pivotally connected near their mid-points. An object is generally supported by both legs above the pivotal connection. Conventionally, one leg is attached to the supported object at a pivot joint and the second leg is attached at the object at a sliding pivot joint. By moving the two supporting pivot joints towards one another, the legs pivot at their mid-points and extend the scissors frame longitudinally to raise the supported object. When the supporting pivot joints of the two legs are moved away from one another in relative position, the supported object is lowered until the frame is eventually collapsed into a storage position. Selectible height adjustment can be achieved with such a construction by arresting the movement of the support portions of the legs away from each other at selected positions.

This general construction has been used for baby walkers and the like to provide adjustable height of the supported object and convenient collapsibility for storage. Various height adjustment mechanisms have been employed to secure the sliding pivot joint in a secured position and thereby lock the frame at a selected height. Locking arms, catches and other devices have been used to releasably lock the sliding leg in a selected position on the supported object. With baby walkers, however, simplicity and convenience of such an adjustable height mechanism is essential because the operator may only have one free hand to operate the adjustable height mechanism. As a result, successful adjustment mechanisms allow operation using only a single hand.

An example of a height adjustment apparatus used in a baby walker is disclosed in U.S. Pat. No. 4,576,392. The mechanism uses a ratchet-type catch assembly for attaching a slide connection between a scissors frame and an object supported by the frame.

The assembly includes a slide disposed in a guide which is mounted to the supported object. The sliding leg is retained by the slide in a pivotable relationship. Therefore, expansion and contraction of the scissors frame is achieved by sliding movement of the slide in the fixed guide. Pawl levers are pivotally mounted on both sides of the slide and connected together at one end by a tension spring. The spring biases the pawl levers to engage the sides of the slide along a series of ratchet stops formed in the slide. Engagement of the pawls with the stops on the ratchet surface of the slide releasably secures the table at selected heights. This mechanism, however, offers only a single sliding connection between the sliding leg and the supported object. This connection, existing between the slide and the guide, is prone to translational forces, torsion and twisting which can cause binding and excessive wear. The sliding relationship is further inhibited by a spring connected between the slide and the leg to provide resilient or "bounce" support of the table. Removal of the bounce feature would require substantial modification to the construction of the device as disclosed. Furthermore, the construction offers inadequate overall structural integrity.

It is therefore desirable to have an adjustable height catch mechanism for scissors frame devices which offers enhanced torsional rigidity and structural integrity in the slide mechanism, is convenient and easy to use, offers low manufacturing cost and can be used with or without a bounce feature.

SUMMARY OF THE INVENTION

The adjustable height mechanism of the present invention is particularly adapted for use with infant furniture such as baby walkers, play seats, feeding tables and the like using scissor frame construction. The mechanism includes a channel coupled to the bottom surface of the object being supported by the scissor frame and two guide rails positioned generally parallel to the channel. Two pawls are connected to the sliding leg of the scissor frame in a spaced relationship. Each pawl is slidably retained on one of the two guide rails corresponding to the location of the pawl on the leg. As the scissors frame expands and contracts, the pawls slide along the guide rails in an aligned manner.

A member is also secured to the sliding leg and is preferably positioned between the pawls to align with, and extend into, the channel. The sliding motion of the sliding leg relative to the supported object is thereby guided along three mechanical slide junctions; two pawl and guide rail connections and the channel and member relationship. This construction enhances torsional rigidity and increases structural integrity of the sliding relationship between the scissors and frame and the supported object while providing smooth sliding travel.

Each pawl includes an outwardly extending tooth extending inwardly towards the centralized channel. Two arms, one corresponding to each of the pawls sliding on a guide rail, are pivotally mounted to the supported object at a pivot end of the arms. The free end of each arm is resiliently biased towards the associated tooth of the adjacent sliding pawl and includes a series of ratchet stops or notches which, when biased against the adjacent pawl, releasably limits the sliding motion of the pawl in one direction while allowing free ratcheting motion of the pawl in the opposite direction. Each ratchet arm also includes a finger grip near the free end to allow the user to pivot the ratchet arm about its pivot end. The pivoting motion allows the user to release the engagement between the arms and the pawls. Release of the engagement between each ratchet arm and its associated pawl is removed simply by the user squeezing the finger grips of the arms towards each other to pivot the arms away from the pawls. The pawls, and therefore the sliding arm leg of the scissors frame, is therefore free to slide along the defined travel path of the guide rails and the channel. Selective engagement of the pawls with the notches on the pivoting arms thereby provide height adjustment of the scissors frame.

In one embodiment of the invention, the height adjustment mechanism includes a remote sliding bounce mechanism to facilitate resilient support or "bounce" support of the object being supported. The adjustable height mechanism, therefore, can be used with, or without a bounce feature unburdened by necessary modification in construction of the adjustment mechanism. The bounce feature is added by simply including the slide bounce assembly in a remote location.

The invention provides a safe, convenient catch mechanism for collapsible scissors frames with enhanced resistance to twisting and structural integrity over prior art designs in a simple, reliable and smooth operating construction. These and numerous other features and advantages will become apparent by the detailed description provided below in conjunction with the drawings appended hereto.

BRIEF DESCRIPTION OF THE DRAWING

FIG. 2b illustrates a user releasing the engagement between the pivot arms and the sliding pawls used in the device illustrated in FIG. 2a;

FIG. 3a is a partial perspective view of the mechanism illustrated in FIG. 2a;

FIG. 3b is a perspective view of a pawl used in the preferred embodiment of the invention;

FIG. 4 is a partial exploded perspective view of the mechanism shown in FIG. 3a;

FIG. 5 is a front elevational view, shown partially in section, of a pawl disposed on a guide rail;

FIG. 6 is a partial perspective view of a bounce spring slide assembly; and

FIG. 7 is a side elevational view shown partially in section of the assembly illustrated in FIG. 6.

DETAILED DESCRIPTION OF THE PREFERRED EMBODIMENT

Figure 1:
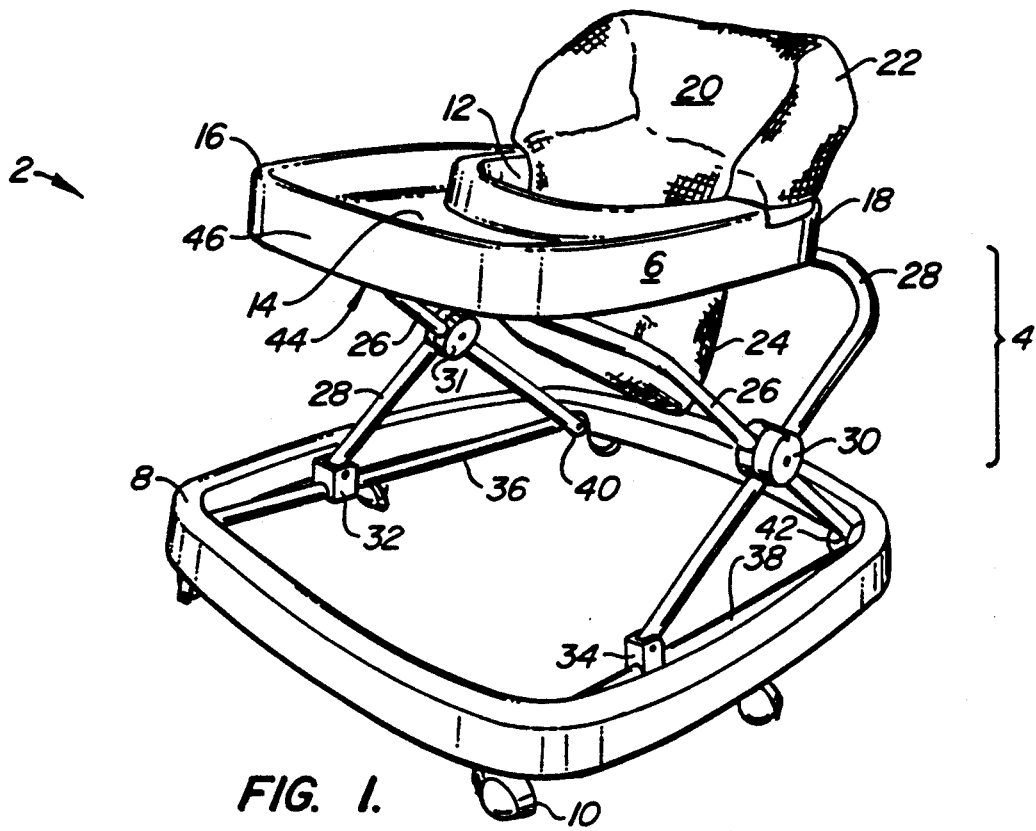
FIG. 1a is a perspective view of a baby walker having a scissors frame and employing the invention.

The invention is intended to be deployed in devices using collapsible scissors frames supporting an object where it is desirable to adjust the height of the object. FIG. 1 illustrates a baby walker 2 employing the invention. Generally, baby walker 2 includes an expandable scissors frame 4 for supporting an object, illustrated as tray 6, above a roller base 8. Roller base 8 includes multiple caster wheels 10 which allow baby walker 2 to roll in any direction. Tray 6 includes a central opening 12 configured to receive the torso of an infant. Tray 6 also includes a forward table, a perimeter wall 6 and a rear portion 18. Preferably, rear portion 18 is made integral with forward table 14 enclosing opening 12 and providing a support platform for seat 20. Seat 20 is configured to have a back support 22 and a saddle 24 to support the infant. The infant can therefore stand upright in opening 12 or sit in saddle 24 while propelling baby walker 2 in any desired direction by walking along the support surface such as a floor through roller base 8.

Scissors frame 4 includes forwardly inclined leg 26 and rearwardly inclined leg 28. Both legs 26, 28 are generally inverted U-shaped and are connected at each side generally at their midpoints forming pivot joints 30, 31. The generally horizontal portion of rearwardly inclined leg 28 is pivotally connected to tray 6 near rear portion 18. The ends of downwardly extending sides of leg 28 are pivotally connected to slides 32, 34 which are secured to slide bars 36, 38. The downwardly extending sides of forwardly inclined leg 26 are pivotally secured to base 8 at pivots 40, 42. The generally horizontal portion of leg 26 is coupled to tray 6 by adjustable catch mechanism 44 more fully described below.

The construction of scissors frame 4 allows for pivotal movement of forwardly inclined leg 26 and rearwardly inclined leg 28 at pivot joints 30, 31 located at each side of the intersecting U-shaped legs 26, 28. Expansion and contraction of scissors frame 4 is achieved by this pivoting motion. Pivots 40, 42 are non-sliding connections as is the pivot connection between rearwardly inclined leg 28 and tray 6 at a hinge joint. The connection between forwardly inclined leg 26 and tray 6, as well as the connection between rearwardly inclined leg 28 and base 8, is a slidable connection to allow scissors frame 4 to extend and collapse as tray 6 is raised and lowered, respectively. For example, as tray 6 is lowered towards base 8, slides 32, 34 connected to rearwardly inclined leg 28 move outwardly along slide bars 36, 38, respectively, away from pivots 40, 42. Likewise, the generally horizontal portion of forwardly inclined leg 26 moves away from rear portion 18 of tray 6. Therefore, the position of the generally horizontal portion of forwardly inclined leg 26, relative to rear portion 18 along tray 6, is directly proportional to the height of tray 6 above roller base 8. This relative position can be adjustably selected and retained by adjustable catch mechanism 44 illustrated in FIGS. 2-4.

Figure 2A:
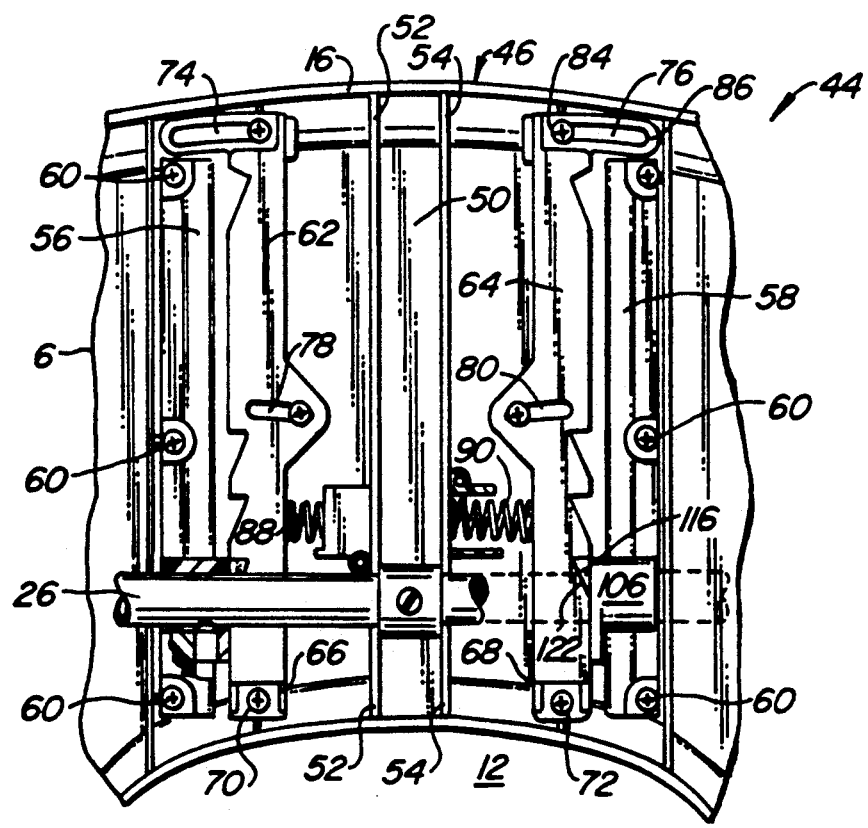
FIG. 2a is a partial bottom plan view of the walker shown in FIG. 1 illustrating the construction of the catch mechanism shown partially in cross-section.
Figure 3A:
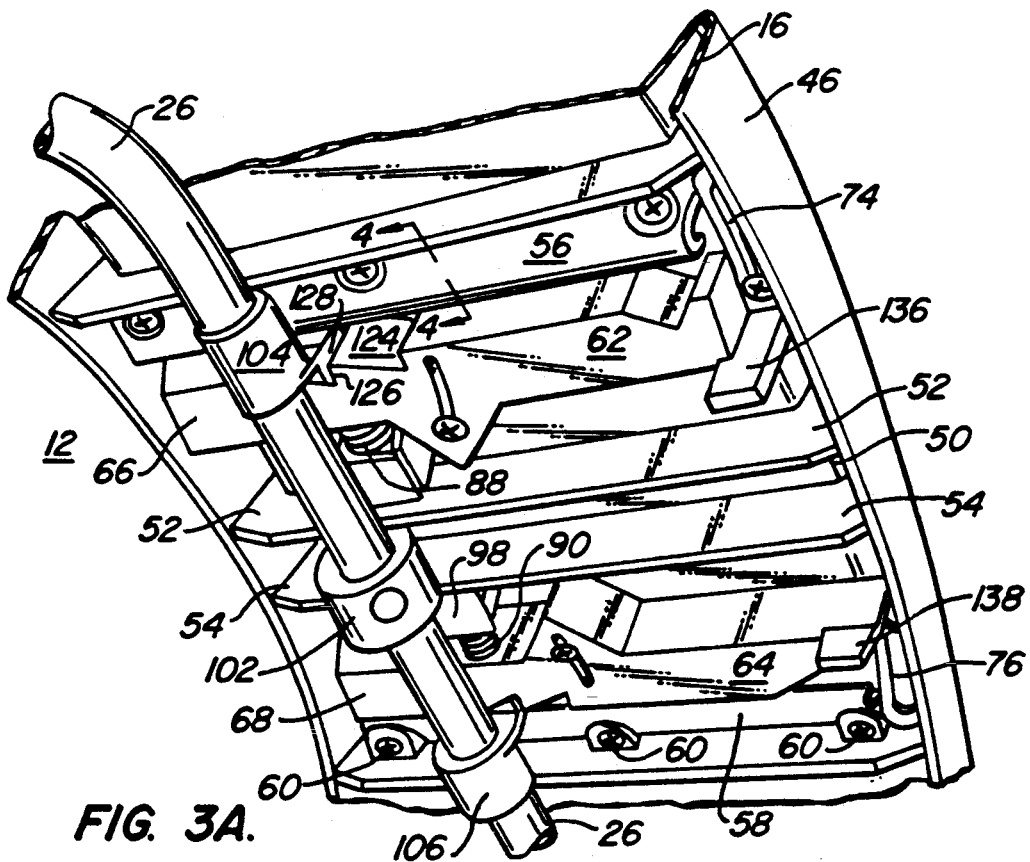

Referring now to FIG. 2a, adjustable catch mechanism 44 is illustrated disposed on the bottom of tray 6 below forward table 14. In the preferred embodiment, adjustable catch mechanism 44 is positioned between opening 12 and front side 46 of perimeter wall 16. Adjustable catch mechanism 44 includes central channel 50 defined by sidewalls 52, 54 formed integrally with tray 6. Guide rails 56, 58 are secured to tray 6 on opposite sides of channel 50 with fasteners 60, preferably screws. Ratchet arms 62, 64 are pivotally mounted to tray 6 at pivot ends 66, 68 respectively using fasteners 70, 72. Arms 62, 64 can pivot about pivot ends 66, 68 limited in travel by end guides 74, 76 and intermediate guides 78, 80. Preferably, end guides 74, 76 and intermediate guides 78, 80 are formed of arced apertures in arms 62, 64 having closed ends forming stops 84, 86. Protrusions, preferably screw fasteners 82, are connected to tray 6 by threading into posts 92, 94 (see FIG. 4) and extend through the appropriate guides as shown. The size and configuration of the guides and corresponding protrusions are selected to provide a non-binding slidable fit. Thus, the free end of arms 62, 64 are smoothly pivotable along an arc with travel limited by the length of the guides. Intermediate guides 78, 80 increase structural integrity but could be omitted to save material if desired.

Fasteners 82 are preferably machine screws or the like having a head and washer 83 functioning as a retaining surface to secure arms 62, 64 against tray 6 while allowing unbinding pivoting movement. Alternatively, the guide - protrusion relationship between arms 62, 64 and tray 6 can be reversed. For example, arms 62, 64 can be constructed having suitable protrusions projecting into guides formed as part of, or coupled to, tray 6.

Figure 4:
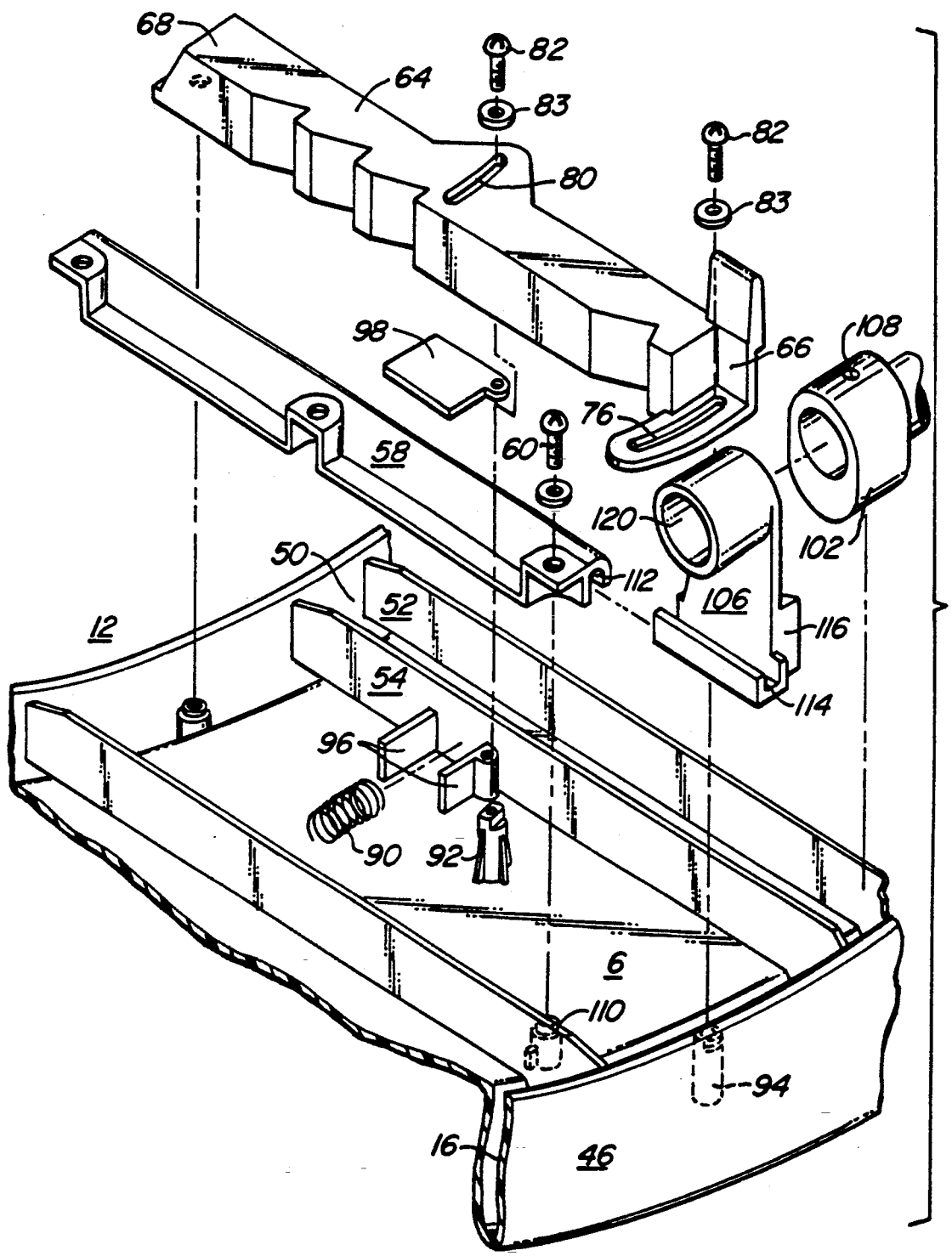

Disposed between channel 50 and arms 62, 64 are resilient members 88, 90, preferably coil springs, which bias arms 62, 64 away from channel 50. More specifically, resilient member 88 is positioned between sidewall 52 and arm 62. Likewise, resilient member 90 is positioned between sidewall 54 and arm 64. In the preferred embodiment, resilient members 88, 90 are located between the pivots ends 66, 68 and intermediate guides 78, 80 of arms 62, 64. Alternatively, resilient members 88, 90 can be positioned anywhere along the length of arms 62, 64 at some distance away from pivot ends 66, 68. Resilient members 88, 90 are preferably coil springs as previously described. The springs are contained in spring housings each formed of housing sidewalls 96 and face plate 98 as best seen in FIG. 4. Housing sidewalls include a bore 100 for receiving a screw to secure face plate 98 against housing sidewalls 96 protecting and containing a substantial portion of resilient member 90 therein. This construction helps center and retain resilient members 88, 90 while providing a safety barrier to protect the user. Resilient members 88, 90 could alternatively be formed as foam or plastic cushions, leaf springs or other resilient bodies if desired.

Secured to the generally horizontal portion of forwardly inclined leg 26 is channel member 102 and pawls 104, 106. Channel member 102 is shaped to extend into channel 50 and is secured to forwardly inclined leg 26 with fastener 108, such as a rivet, screw or similar device. Channel member 102 is fabricated to smoothly slide between sidewalls 52, 54 and direct the motion of forwardly inclined leg 26 in a linear travel path as scissors frame 4 moves between an extended and collapsed condition. Pawls 104, 106 each are slidably retained on guide rails 56, 58, respectively, and thereby slidably connect forwardly inclined leg 26 to tray 6 along each rail. As a result of this construction, there are three sliding junctions coupling forwardly inclined leg 26 to tray 6. These three junctions are the sliding connections between pawl 106 and guide rail 56, pawl 106 and guide rail 58 and channel 102 with channel 50. This construction enhances lateral stability and resistance to twisting resulting in superior overall structural integrity, enhanced safety and increased load bearing capacity.

Referring now to FIG. 4, part of adjustable catch mechanism 44 is partially shown in exploded view. This view helps to illustrate component parts and overall construction for one of the pawl-guide rail and ratchet arm assemblies. For brevity, only one such assembly is shown. It is appreciated that the assembly shown in FIG. 4 is a mirror image of the pawl-guide rail and ratchet arm combination located on the opposite side of channel 50. Guide rail 58, made of smooth, strong and non-binding plastic or metal and is secured to tray 6 using suitable fasteners 60, such as screws, which thread into suitable grommets or posts 110. Guide rail 58 is shaped to have a generally J-shaped running surface 112 which receives and retains a corresponding curved hanger 114 extending from pawl 106. Pawl 106 also includes an outwardly extending tooth 116, a base 118 and cylinder 120. Cylinder 120 receives and secures onto forwardly extending leg 26 while base 118 abuts a surface on tray 6 when pawl 106 is slidably suspended from guide rail 58. The relationship between pawl 106 and guide rail 58 is selected to minimize play without inhibiting sliding motion. Suitable rigid plastics with smooth outer surfaces resistant to warping are preferably used in construction of assembly 44.

Tooth 116 extends away from pawl 106 in the direction towards the corresponding ratchet arm 64. Tooth 116 has a face 128 and angled sidewall 130 configured for ratchet engagement against notches formed in the adjacent pivot arm 64 as more fully described below. The configuration of pawl 118 is best appreciated by comparing FIGS. 3b and 4.

In operation, the construction of adjustable catch mechanism 44 provides free ratcheting movement of forwardly inclined leg 26 in the direction towards opening 12 (herein referred to as the "distal to proximal" direction) to facilitate expansion of scissors frame 4 to elevate tray 6. Thus, when the user unfolds baby walker 2 to the extended, deployed condition, scissors frame 4 is allowed to freely extend uninhibited by adjustable catch mechanism 44. Audible clicking sounds are produced by the ratcheting engagement between the pawls 104, 106 with associated ratchet arms 62, 64. Movement of forwardly inclined leg 26 in the opposite proximal to distal direction, that away from opening 12, is subject to releasable yet secured retention between the pawls and the ratchet arms. This relationship is best illustrated by comparing FIGS. 2a and 2b.

As shown in FIG. 2a, when ratchet arms 62, 64 are in their free condition, resilient members 88, 90 generally bias the free ends of arms 62, 64 towards guide rails 56, 58 to engage pawls 104, 106. Arms 62, 64 each include multiple notches or ratchet stops 122 facing channel 50, each having an inclined side 124 and a stop surface 126. Inclined side 124 inclines towards channel 50 in the proximal to distal direction from opening 12. Tooth 116 extends from pawls 104, 106 in the direction towards ratchet stops 122 and includes a face 128 and a sidewall 130 as previously described. As shown in FIG. 2a, tooth 116 on pawl engages ratchet stop 122 and stop surface 126 engages face 128. The biasing force of resilient members 88, 90 force arms 62, 64 towards guide rails 56, 58 to retain the engagement of pawls 104, 106 with ratchet stops 122. The angled configuration of inclined side 124 of ratchet stops 122, and sidewall 130 of tooth 116, allow pawls 104, 106 to move in the distal to proximal direction relative to opening 112 in a ratcheting relationship. Motion in the opposite direction, that is in the proximal to distal direction relative to opening 12, is arrested by the engagement of pawls 104, 106 in ratchet stops 122.

In the preferred embodiment, four ratchet stops 122 are provided on each arm 62, 64. This configuration allows a wide range of adjustability for the user. Each ratchet stop 122 provides a different height of tray 6 over base 8 by varying the amount of extension of scissors frame 4. Alternatively, a greater or fewer number of ratchet stops 122 can be employed on each arm. The number of ratchet stops 122 is directly proportional to the number of preset and selectable height adjustments available to the supported object. Tray 6 can be raised by ratcheting movement of forwardly inclined leg 26 through pawls 104, 106 as they slide in a ratcheting movement along arms 62, 64 until available travel of pawls 104, 106 along guide rails 56, 58 is exhausted.

Thus, the length of guide rails 56, 68 is selected for the particular purpose.

Figure 2B:
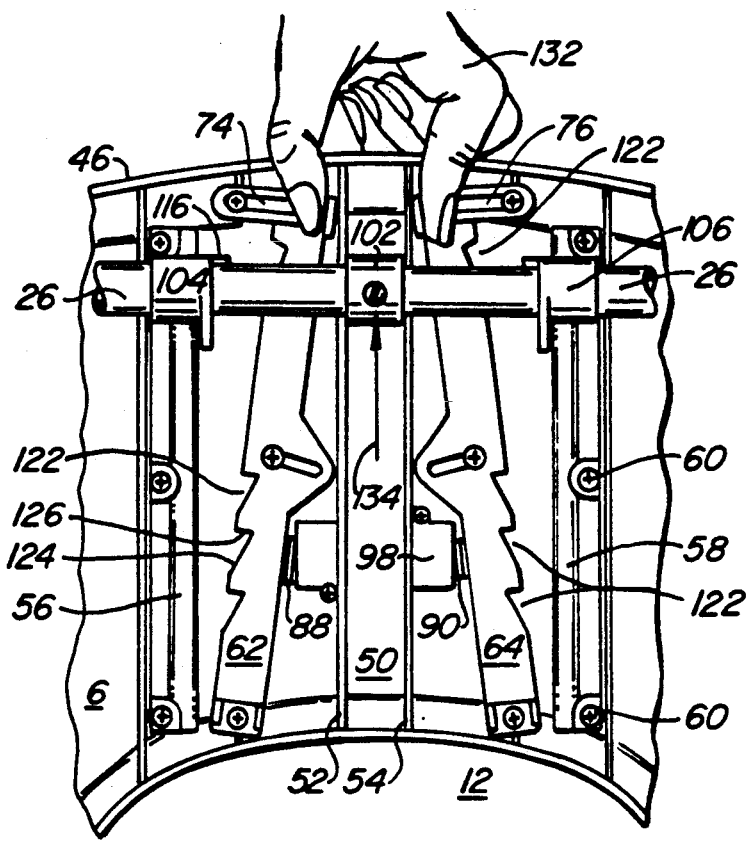

An important feature of the invention is the ease at which the height securing adjustment of adjustable catch mechanism 44 can be released by the user. Referring now to FIG. 2b, a user's hand 132 is illustrated releasing the engagement of arms 62, 64 from pawls 104, 108 to allow forwardly inclined leg 26 to slide freely in the proximal to distal direction relative to opening 12 as indicated by arrow 134. Each arm 62, 64 includes a finger grip 136, 138, respectively. Finger grips 136, 138 are positioned at or near the free ends of arms 62, 64 and extends away from tray 6. The size and length of finger grips 136, 138 is selected to extend below perimeter wall 16 of tray 6 to facilitate easy access by a hand of the user. The user can easily reach under tray 6 and locate finger grips 136, 138 by tactile feel. Squeezing finger grips 136, 138 together as shown in FIG. 2b, releases the securing engagement of adjustable catch mechanism 144 to allow the user to adjust the height of tray 6 or to collapse scissors frame 4 into a folded condition for storage. Likewise, if the user wishes to raise the object supported and eliminate the audible clicking engagement between pawls 104, 106 and ratchet stops 122, this squeezing motion will also disengage the arms for that purpose. It is, however, a feature of the invention to allow the user to simply raise the object and extend scissors frame 4 by pulling up on tray 6 until pawls 104, 106 engage the appropriate ratchet stops 122 corresponding to the particular height desired.

Finger grips 136, 138 are conveniently and safely located under tray 6 to provide protection from unintentional lateral forces or potential breakage. Additionally, the preferred structure positions finger grips 136, 138 between forwardly inclined leg 26 and front side 46 of tray 6. Forwardly inclined leg 26 provides a further structural shield between an infant in opening 12 and finger grips 136, 138. This nearly eliminates the possibility that the infant could somehow release the secured height adjustment provided by adjustable catch mechanism 44 by inadvertent movement of finger grips 136, 138.

With baby walkers, and other baby furniture, it is sometimes desirable to incorporate a "bounce" mechanism into the device to facilitate resilient support of the object, such as tray 6. Bounce mechanisms have been employed in baby walkers to allow the infant to obtain a bouncing motion in the walker as the infant is supported by a saddle 24 which is suspended from tray 6. In an alternative embodiment of the invention, bounce mechanism 150 is provided on rear portion 18 of tray 6 as illustrated in FIG. 6 to achieve this bounce support. Bounce mechanism 150 includes a hinge joint to allow rearwardly inclined leg 28 to pivot as scissors frame 4 extends and collapses. Hinge joint 152 is constructed as a cylindrical housing for rearwardly inclined leg 28 to allow rotation of leg 28 in the housing while retaining a secure support for coupling to tray 6. As best seen in FIGS. 6–7, hinge joint 152 is secured to brace plate 154 preferably in an integral fashion. Slide plate 156 includes two slots 158. Fasteners 160, preferably rivets, secure brace plate 154 to back plate 162 slidably positioned between slide plate 156 and rear portion 18 of tray 6. Spring 164 is positioned between back plate 162 and perimeter wall 16 biasing back plate 162 and therefore rearwardly inclined leg 28 away from perimeter wall 16 and towards opening 12. As a load is produced on tray 6, such as an infant sitting in saddle 24 suspended from tray 6 or the infant pushing down on tray 6 while standing in opening 12, scissors frame 4 is allowed to resiliently change in height as rearwardly inclined leg 28 moves slightly towards perimeter wall 16 against the biasing force of spring 164, indicated in phantom lines 166, as brace plate 154 moves in the direction of arrow 168. Preferably, slide plate 156 is formed of metal to provide strength and increase resistance to wear and bending. Likewise, back plate 162 can also be made or metal for similar reasons. Alternatively, plastics can be used. The strength of the mechanism thus efficiently distributes vertical and horizontal loads communicated from rearwardly inclined leg 28 along the axis of sliding movement through slots 158 of slide plate 156. Slide plate 156 is secured to tray 6 using slide barriers 170, 172 which also act as lateral stops and guides for the sliding movement of brace plate 154.

An advantage of the invention is that adjustable catch mechanism 44 can be easily deployed in baby furniture with or without bounce mechanism 150. There is no need to modify catch mechanism 44 to accept or remove the bounce feature. Bounce mechanism 150 is remotely positioned away from adjustable catch mechanism 44 for this purpose. The combination of bounce mechanism 150 and adjustable catch mechanism 44 provide a sturdy, reliable, safe and convenient coupling apparatus between scissors frame 4 and tray 6. This combination, of course, is not limited to deployment in baby walkers. Where desirable, the combination can be used in other devices using folding scissors frames.

The foregoing description of the preferred embodiments of the invention have been presented for purposes of illustration and description. It is not intended to be exhaustive or to limit the invention to the precise form disclosed, and many modifications and variations are possible in light of the above teaching without deviating from the spirit and the scope of the invention. The embodiments described are selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. An adjustable catch mechanism for adjusting the height of an object, the object mounted on a collapsible scissors frame having a first leg pivotally connected to a second leg, the object coupled to the second leg at a hinge joint, the mechanism comprising:
   a channel coupled to a bottom surface of the object and defining a travel path;
   a member mounted on the first leg and slidably disposed in said channel;
   first and second guide rails secured to the bottom surface of the object generally parallel to said channel;
   a first pawl slidably connecting the first leg to the first guide rail and a second pawl slidably connecting the first leg to the second guide rail, the first and second pawls each having an outwardly extending protrusion;
   a first arm having a pivot end, a free end and a finger grip near the free end, the pivot end pivotally mounted to the bottom surface of the object, the first arm including a plurality of indentations configured from a row of ratchet stops for receiving the outwardly extending protrusion of the first pawl, said protrusion being configured to engage said ratchet stops in a racheting motion subject to the biasing force of the first arm biasing means as the first leg moves toward the hinge joint;

means for resiliently biasing the free end of the first arm towards the outwardly extending protrusion of the first pawl including a first resilient member engaging the first arm generally between the free end and the pivot end;

a second arm having a pivot end, a free end and a finger grip near the free end, the pivot end pivotally mounted to the bottom surface of the object, the second arm including a plurality of indentations each configured to receive the outwardly extending protrusion of the second pawl;

means for resiliently biasing the free end of the second arm towards the outwardly extending protrusion of the second pawl; and wherein selected engagement of the first and second protrusions with the indentations of the first and second arms respectively limit the motion of the member in the channel in a direction away from the hinge joint.

2. The mechanism of claim 1 wherein the first arm is positioned generally between the first pawl and the channel.

3. The mechanism of claim 2 wherein the second arm is positioned generally between the second pawl and the channel.

4. The mechanism of claim 1 wherein the resilient member is a coil spring.

5. The mechanism of claim 1 further comprising means for guiding pivoting motion of the free end of the first arm in a defined arc.

6. The mechanism of claim 5 wherein the free end guiding means includes an end guide having a curved aperture configured to correspond to said arc and a post mounted to the bottom surface of the object and extending through the aperture.

7. The mechanism of claim 6 wherein the post includes a means for limiting motion of the free end in a direction away from the object.

8. The mechanism of claim 1 wherein the object includes an opening configured to receive a torso of an infant and the scissors frame is connected to a rolling base.

9. The mechanism of claim 1 wherein the first leg and the second leg engage the object in a spaced apart relation and said hinge joint includes a means for resiliently biasing an upper portion of the second leg towards an upper portion of the first leg.

* * * * *